UNITED STATES PATENT OFFICE.

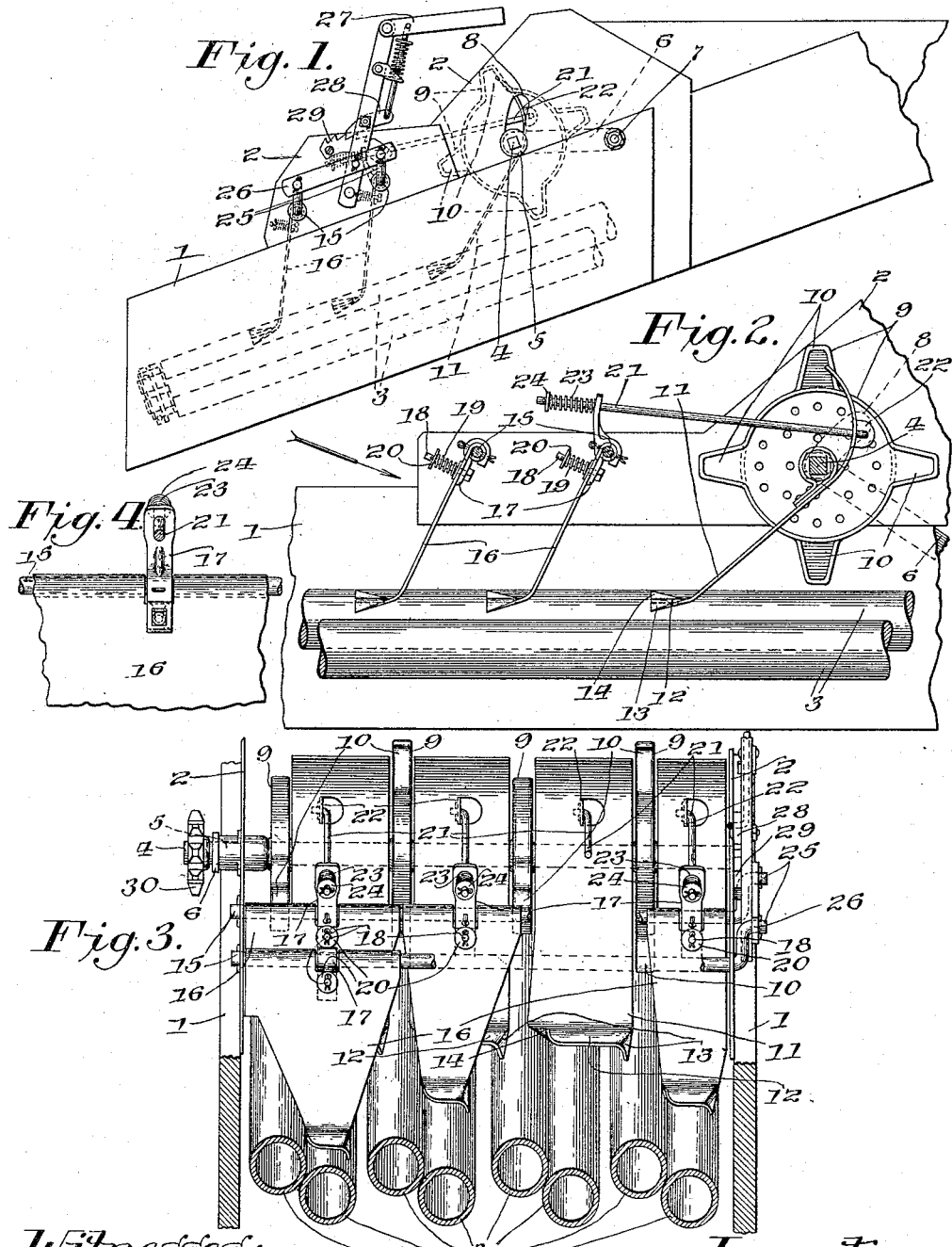

JOHN A. STONE, OF CHICAGO, ILLINOIS, ASSIGNOR TO INTERNATIONAL HARVESTER COMPANY OF NEW JERSEY, A CORPORATION OF NEW JERSEY.

CORN-HUSKER.

1,202,117.  Specification of Letters Patent.  Patented Oct. 24, 1916.

Application filed August 26, 1914. Serial No. 858,592.

*To all whom it may concern:*

Be it known that I, JOHN A. STONE, a citizen of the United States, residing at Chicago, in the county of Cook and State of Illinois, have invented certain new and useful Improvements in Corn-Huskers, of which the following is a full, clear, and exact specification.

My invention relates to corn huskers, and in particular to improved ear retarder and ear alining mechanism coacting with the husking rollers in a manner whereby the ears are directed against the rolls substantially parallel with their axes and yieldingly held in engagement therewith.

The object of the invention is to provide a mechanism simple in its construction and efficient in operation. This object is attained by means of mechanism, one embodiment of which is illustrated in the accompanying drawings, in which—

Figure 1 is a side elevation of part of a corn husking machine having my invention embodied in its construction; Fig. 2 is a longitudinal section of Fig. 1 on an enlarged scale; Fig. 3 is an end elevation of Fig. 2 in the direction of the arrow; and Fig. 4 is a detached detail designed to illustrate the manner of mounting the ear retarders.

Referring to the drawings, wherein the same reference numerals designate like parts throughout the several views, the frame of the machine shown includes downwardly inclined side members 1, having vertically disposed plates 2 secured to their upper ends, 3 downwardly inclined coacting husking rollers disposed in pairs and rotatable in opposite directions, journaled in bearings carried by the frame of the machine and having one roll of each pair preferably in a plane above its coacting roll.

4 represents an angular shaft disposed transversely of the machine journaled in bearings 5 integral with arms 6 that are pivotally connected at 7 with the side members 1 of the machine near the upper ends and above the husking rollers, the bearings being received by concentric slots 8 in the plates 2 in a manner permitting the shaft to swing about the axis of the arms to a limited extent.

9 represents rotatable ear alining members or disks carried by the shaft 4, spaced apart laterally upon the shaft and provided with oppositely disposed teeth 10 upon their peripheries, two teeth upon each member, the teeth and spaces alternating laterally, as shown in Fig. 3, and the aliners being arranged in substantially the same vertical plane as the higher husking roll of each coacting pair.

11 represents ear retarders journaled intermediate their ends upon the shaft 4 between the ear alining members 9 having their lower ends inclined downward toward the delivery ends of the husking rolls and terminating in a flat portion 12 normally disposed in a horizontal plane above the lower of each pair of husking rolls and having one side 13 turned downward, and the opposite side 14 upward to facilitate the passage of ears. The upper ends of the retarders are curved upward in front of the shaft 4 and their bodies preferably fill the space between the ear alining members 9 and form an upper wall for the feeding throat leading toward the husking rollers.

15 represents a pair of rock shafts journaled in the plates 2 and spaced apart in rear of the shaft 4 toward the lower ends of the husking rolls and each shaft carries a series of ear retarders 16 having their upper ends journaled upon the shafts and inclining rearward and downward with converging sides, having their narrow front ends turned normally in horizontal planes above the lower of each pair of husking rolls, and one side of each turned downward and the opposite side upward similar to the members 11.

17 represents depending arms secured to the rock shafts, there being one arm for each retarder, and the retarders are yieldingly connected with the arms by means of bolts 18 carrying compression springs 19 that react between a pin and washer 20 carried by the free end of the bolt and the arm in a manner permitting the retarders to swing about the axes of the rock shafts to a limited extent. The arms upon one of the rock shafts, preferably the front one, are extended above the shaft, and 21 represents rods having their rear ends slidably received by openings in the free ends of the extensions and their opposite front ends connected with ear members 22 carried by the retarders 11 above the shaft 4.

23 represents compression springs carried by the free ends of the ears and reactive between a pin and washer 24 and the extensions of the arms in a manner to yieldingly permit a rocking movement in one direction of the retarders 11 about the axis of the shaft 4.

The rock shafts 15 are provided at one end with upwardly turned crank arms 25 that are connected by means of a bar 26, and 27 represents a hand lever pivotally connected with a fixed part of the machine and with the bar 26 in a manner whereby the rock shafts may be adjusted angularly, and 28 represents a spring controlled pawl carried by the hand lever and engaging with a toothed sector 29 in a manner to secure the lever in any desired position of adjustment.

In operation motion is transmitted to the shaft 4 by means including a sprocket wheel 30 secured to one end thereof. The ears of corn are delivered at the upper ends of the husking rolls. The rotating alining members 9 engage the ears and turn them parallel with the axes of the rolls and feed them downward against the retarders 11, the shaft 4 carrying the retarders being free to rise bodily or at either end independently to permit the retarders to accommodate themselves to variable quantities of material being delivered to the rollers. The retarders yieldably press the ears against the rolls and the reversely turned side wings thereof operate as supplemental alining members. The three series of retarders are jointly controlled by the hand lever mechanism and are also permitted a limited independent angular movement about their axes.

While I have, for purposes of illustration, shown and described herein a preferred form of my invention, I do not intend to be confined to the specific construction as shown, it being understood that many changes in form, proportion and assemblage of parts may be made without departing from the spirit of my invention.

What I claim as new and desire to secure by Letters Patent is:

1. In a corn handling machine, coöperating corn treating rolls, and a floating disk at the receiving end of said rolls for alining and feeding ears of corn relatively to said rolls.

2. A corn husking machine including axially inclined husking rolls disposed in coacting pairs and floating rotatable laterally spaced ear feeding and alining disks, one for each pair of rolls, disposed in vertical planes at the receiving ends of said rolls offset to one side of the coacting peripheries of each pair of said coacting husking rolls.

3. A corn husking machine including axially inclined husking rolls disposed in coacting pairs and floating rotatable laterally spaced ear feeding and alining disks, one for each pair of rolls, provided with oppositely disposed diametrical teeth, the disks being arranged in vertical planes at the receiving ends of said rolls offset to one side of the coacting peripheries of each pair of said coacting husking rolls and having the teeth upon the spaced disks in alternate relation.

4. A corn husking machine including axially inclined husking rolls disposed in coacting pairs, a floating rotatable shaft journaled above the receiving ends of said rolls, ear feeding and alining members spaced apart and secured to said shaft, and rocking ear retarders carried by said shaft between said feeding members and curved downward and rearward and upward and rearward from said shaft and forming a feed throat at the receiving ends of said rolls.

5. A corn husking machine including axially inclined coacting pairs of husking rolls, a floating rotatable shaft journaled above the receiving ends of said rolls, ear feeding and alining elements spaced apart and carried by said shaft, and rocking ear retarding plates mounted upon said shaft and filling the spaces between said feeding elements, said plates being inclined downward and rearward below said shaft and provided with horizontally disposed parts at their rear ends, one side of said parts being turned upward and the remaining side of said parts turned downward, the front ends of said plates being curved upward in front of said shaft in a manner forming a feeding throat at the receiving ends of said husking rolls.

6. A corn husking machine including axially inclined coacting pairs of husking rolls, a floating rotatable shaft journaled above the receiving ends of said rolls, ear feeding and alining elements spaced apart and carried by said shaft, rocking ear retarding plates mounted upon said shaft and filling the spaces between said feeding elements, said plates being inclined downward and rearward below said shaft and provided with horizontally disposed parts at their rear ends, one side of said parts being turned upward and the remaining side of said parts turned downward, the front ends of said plates being curved upward in front of said shaft in a manner forming a feeding throat at the receiving ends of said husking rolls, and spring mechanisms operative to yieldingly rock said plates and cause their rear ends to approach said rolls.

7. A corn husking machine including axially inclined coacting pairs of husking rolls, a floating rotatable shaft journaled above the receiving ends of said rolls, ear feeding and alining elements and ear retarders carried by said shaft, rock shafts spaced apart toward the rear ends of said rolls and parallel with said rotatable shaft, downwardly and rearwardly inclined ear retarders carried by said rock shafts, said rock shafts having crank arms at one end thereof, a bar pivotally connecting said crank arms, hand lever mechanism connecting said bar adjustably with a fixed part of the machine, upwardly extending arms secured to one of said rock shafts, and link connections between said arms and the ear retarders carried by said rotatable shaft.

8. A corn husking machine including axially inclined coacting pairs of husking rolls, a floating rotatable shaft journaled above the receiving ends of said rolls, ear feeding and alining elements and ear retarders carried by said shaft, rock shafts spaced apart toward the rear ends of said husking rolls and parallel with said rotatable shaft, downwardly and rearwardly inclined ear retarders carried by said rock shafts and permitted a yielding independent rocking movement about the axes thereof, said rock shafts having crank arms at one end thereof, a bar pivotally connecting said crank arms, hand lever mechanism connecting said bar adjustably with a fixed part of the machine, and upwardly extending arms secured to the front rock shaft, said arms being yieldably and slidably connected with the ear retarders carried by said rotatable shaft whereby said retarders are permitted a limited independent rocking movement about the axis of said rotatable shaft.

9. A corn husking machine including axially inclined coacting pairs of husking rolls having one roll of each coacting pair journaled in a plane above its opposing roll, rock shafts journaled above and transversely of said rolls, and rocking ear retarders carried by said shaft and inclined downward and rearward toward said rolls having their opposite edges converging rearward and their free ends turned in substantially a horizontal plane above the lower roll of each pair in the same vertical plane and having one side turned toward the lower roll and the opposite side in an opposite direction.

10. A corn handling machine including coacting corn treating rolls, an ear feeding member located over said rolls, and an ear retarding member having a portion adjacent said feeding member forming a feeding throat.

In testimony whereof I affix my signature, in the presence of two witnesses.

JOHN A. STONE.

Witnesses:
  F. HACKER,
  W. F. SIGWALT.

Copies of this patent may be obtained for five cents each, by addressing the "Commissioner of Patents, Washington, D. C."